US008813778B2

United States Patent
Bachmann et al.

(10) Patent No.: US 8,813,778 B2
(45) Date of Patent: Aug. 26, 2014

(54) MANUALLY ACTUATED CONTROL MODULE

(71) Applicant: Buerkert Werke GmbH, Ingelfingen (DE)

(72) Inventors: René Bachmann, Grosserkmannsdorf (DE); Ulrike Brinkmann, Grosserkmannsdorf (DE); Kersten Grosse, Radebeul (DE)

(73) Assignee: Buerkert Werke GmbH, Ingelfingen (DE)

( * ) Notice: Subject to any disclaimer, the term of this patent is extended or adjusted under 35 U.S.C. 154(b) by 16 days.

(21) Appl. No.: 13/778,752

(22) Filed: Feb. 27, 2013

(65) Prior Publication Data

US 2013/0221254 A1     Aug. 29, 2013

(30) Foreign Application Priority Data

Feb. 27, 2012 (DE) .................... 20 2012 002 019 U

(51) Int. Cl.
*F16K 31/06* (2006.01)
*F16K 31/02* (2006.01)
*F16K 31/08* (2006.01)

(52) U.S. Cl.
CPC .................... *F16K 31/08* (2013.01);
*F16K 31/02* (2013.01)
USPC ............... 137/554; 251/129.04; 324/207.13; 324/207.14; 324/207.2

(58) Field of Classification Search
USPC ................ 137/554; 251/129.01, 129.04; 324/207.11, 207.13, 207.14, 207.2
See application file for complete search history.

(56) References Cited

U.S. PATENT DOCUMENTS

| | | | |
|---|---|---|---|
| 5,551,953 A * | 9/1996 | Lattin et al. | 604/20 |
| 5,706,007 A | 1/1998 | Fragnito et al. | |
| 7,460,013 B1 | 12/2008 | Osborne et al. | |
| 7,784,490 B1 * | 8/2010 | Stewart et al. | 137/554 |
| 7,994,886 B2 * | 8/2011 | Bedell | 324/207.2 |
| 2003/0183792 A1 * | 10/2003 | Muraji | 251/129.04 |
| 2009/0125024 A1 * | 5/2009 | Baur | 335/205 |
| 2011/0057131 A1 | 3/2011 | Bachmann et al. | |

FOREIGN PATENT DOCUMENTS

| | | |
|---|---|---|
| DE | 8235959 U1 | 11/1983 |
| DE | 10054740 A1 | 5/2002 |
| DE | 20 2004 000 201 | 4/2004 |
| DE | 102007030405 B3 | 10/2008 |

(Continued)

OTHER PUBLICATIONS

European notification of an appeal mailed on Jan. 22, 2014 for European patent No. EP 2 292 958.

(Continued)

*Primary Examiner* — John Bastianelli
(74) *Attorney, Agent, or Firm* — Lowe Hauptman & Ham, LLP

(57) ABSTRACT

A valve control system includes a valve control device and a hand-held actuating apparatus for triggering operating actions within the valve control device. The hand-held actuating apparatus includes a magnet arrangement and the valve control device includes a magnetic field sensor arrangement adapted to the magnet arrangement of the hand-held actuating apparatus. The magnet arrangement includes one or more magnets and an actuating means. The magnetic fields of the magnets are individually variable by the actuating means without movement of the hand-held actuating apparatus relative to the magnetic field sensor arrangement.

10 Claims, 3 Drawing Sheets

(56) References Cited

FOREIGN PATENT DOCUMENTS

| | | |
|---|---|---|
| DE | 20 2009 012 183 | 11/2009 |
| EP | 1643175 A2 | 4/2006 |
| FR | 2812926 A1 | 2/2002 |
| WO | 02093058 A1 | 11/2002 |
| WO | 2004099657 A1 | 11/2004 |

OTHER PUBLICATIONS

German Search Report dated Nov. 13, 2012 for German Patent Application No. 20 2012 002 019.6.

* cited by examiner

US 8,813,778 B2

MANUALLY ACTUATED CONTROL MODULE

CROSS-REFERENCE TO RELATED APPLICATION

This application claims the priority of German Patent Application No. 20 2012 002 019.6, filed on Feb. 27, 2012 in the German Patent and Trade Mark Office (DPMA), the disclosure of which is incorporated herein in their entirety by reference.

TECHNICAL FIELD

The invention relates to a valve control system comprising a valve control device and a hand-held actuating apparatus for triggering operating actions within the valve control device.

BACKGROUND OF THE INVENTION

Known solutions in the field of valve controls require mechanical actuations by hand within the valve control device or complex wire-bound or wireless data transmission techniques (in particular radio or infrared are known in this field), or are based on conventional operating possibilities such as the actuation of buttons covered by a covering foil.

The opening of a housing or the removal of a housing part to reach the interior of a valve control device is complicated and time-consuming. Wire-bound techniques are expensive for the typically required high protection demands. The wireless data transmission, e.g. via a radio modem, is also too expensive for most applications. The operation via buttons requires reliable and thus expensive control panels which have to be supplied with electric power.

German utility model DE 20 2009 012 183 U1 proposes a new type of contactless operating concept which does not require expensive radio transmission. A mobile hand-held actuating apparatus comprises a magnet arrangement adapted to a magnetic field sensor arrangement of the valve control device. The hand-held actuating apparatus is brought and, if necessary, moved in proximity to the valve control device. Depending on the orientation or movement (in particular on the direction of movement) of the magnets of the magnet arrangement relative to the sensors of the magnetic field sensor arrangement, the magnetic field sensor arrangement generates a signal which is characteristic of the respective orientation and/or movement. In this way, different signals can be generated in a contactless manner in the valve control device using the hand-held actuating apparatus. The signals are associated with different commands defined in the control electronics.

It is an object of the invention to expand the known reliable and comfortable contactless operation of a valve control device such that more complex operating and adjusting actions can be carried out in a simple manner.

SUMMARY OF THE INVENTION

The valve control system according to the invention has a valve control device and a hand-held actuating apparatus for triggering operating actions within the valve control device. The hand-held actuating apparatus includes a magnet arrangement, and the valve control device includes a magnetic field sensor arrangement adapted to the magnet arrangement of the hand-held actuating apparatus. (Here, a magnetic field sensor arrangement adapted to the magnet arrangement of the hand-held actuating apparatus is to be understood as a sensor arrangement which can detect a magnetic field generated by the magnet arrangement when the magnet arrangement is close to the magnetic field sensor arrangement). According to the invention, the magnet arrangement includes one or more magnets and an actuating means. The magnetic fields of the magnets are individually variable by the actuating means without movement of the hand-held actuating apparatus relative to the magnetic field sensor arrangement.

In case of a single magnet, only one magnetic field is variable. For the sake of simplicity, the magnetic fields are considered separately in case of several magnets, though they are of course superimposed so as to form an overall magnetic field.

The specific characteristic of the valve control system according to the invention is that a user is able to generate commands for the control electronics of the valve control device merely by the individual change of the magnetic fields, without movement of the hand-held apparatus. The change of the magnetic field of a single magnet of the magnet arrangement comprises in particular a change of the spatial position, of the field strength and/or of the direction of the magnetic field. By an intentional change of the magnetic fields of individual magnets, it is possible to generate a plurality of command codes which can be detected by the magnetic field sensor arrangement and can then be decoded. In this way, it is possible to carry out very extensive operating actions in a contactless manner without having to open the housing of the valve control device. It is in the same way possible to easily carry out adjustments in the valve control device.

According to a first preferred embodiment of the invention, an actuating means is provided in which the magnets are adapted to be individually shifted from a first position to a second position to vary the individual magnetic fields. The shifting of a magnet results in a change at least of the spatial position of the associated magnetic field relative to the magnetic field sensor arrangement such that this characteristic change can be detected by the magnetic field sensor arrangement. It is generally irrelevant in which direction the magnets are moved.

A configuration is advantageous in which in the first position the distance of the magnets from a housing side of the hand-held actuating apparatus is greater than in the second position. When the hand-held apparatus is held via the appropriate housing side on the magnetic field sensor arrangement of the valve control device, the valve control device respectively detects a considerably stronger magnetic field as soon as a magnet is shifted to the second position, i.e. closer towards the magnetic field sensor arrangement.

In view of a comfortable operation for a user, the shifting of the magnets is to be permitted in a simple way. This requirement is met by an embodiment of the actuating means including buttons, each magnet being coupled to a button such that depressing the button causes the magnet to be shifted. The coupling of the magnets to individual buttons permits a comfortable input of commands by simply pressing the buttons. It is particularly advantageous that the thus-formed keyboard does not require any auxiliary power in case permanent magnets are used.

In order that the buttons automatically reach again their initial position after being depressed, a pretensioning mechanism is preferably provided which pretensions the respective button contrary to a shifting direction.

For a command input, it may be expedient that the magnet remains in the second position for the time being. For this purpose, a locking mechanism may be provided, which causes the button to lock when the magnet reaches the second position in order to keep the button in the pressed state. When the user releases the locking, the button is automatically moved back to its initial position by the pretensioning mechanism mentioned above, such that the magnet moves back to its first position.

To avoid operating errors, a holder is expedient in which the hand-held actuating apparatus can be stably held at a defined distance and in a defined arrangement relative to the magnetic field sensor arrangement. It is thus ensured that an unintentional movement of the hand-held actuating apparatus is not erroneously interpreted as a command input.

Operation is facilitated by the fact that, for command input, specific magnets are shifted in a specific position and remain there. In this case, it is advantageous that the magnetic field sensor arrangement is designed such that it can detect per se the presence of the magnetic fields of the magnets individually, preferably also the quantitative field strength and/or the direction of the magnetic fields, rather than (merely) the change thereof. It is thus possible, for example, to identify a pressed button combination, even when the buttons have been pressed before having moved the hand-held actuating apparatus in proximity to the magnetic field sensor arrangement.

According to a second preferred embodiment of the invention, an actuating means is provided in which the magnets are solenoids which are separately controllable by the actuating means. In this case, for an intentional variation of magnetic fields, the field strength and/or the polarity of solenoids are influenced individually by an appropriate current supply, instead of shifting permanent magnets. Controlling may correspond to a predetermined chronological sequence to thus create a wireless and contactless, sequential data transmission from the hand-held actuating apparatus into the valve control device. Electrical controlling may of course also be combined with a manual shifting of the magnets to create even more operating possibilities.

In a user-friendly further development of the invention, the hand-held actuating apparatus includes a display on which information for operation and/or on the current status of the valve control device is displayed.

DETAILED DESCRIPTION

Figure 1:
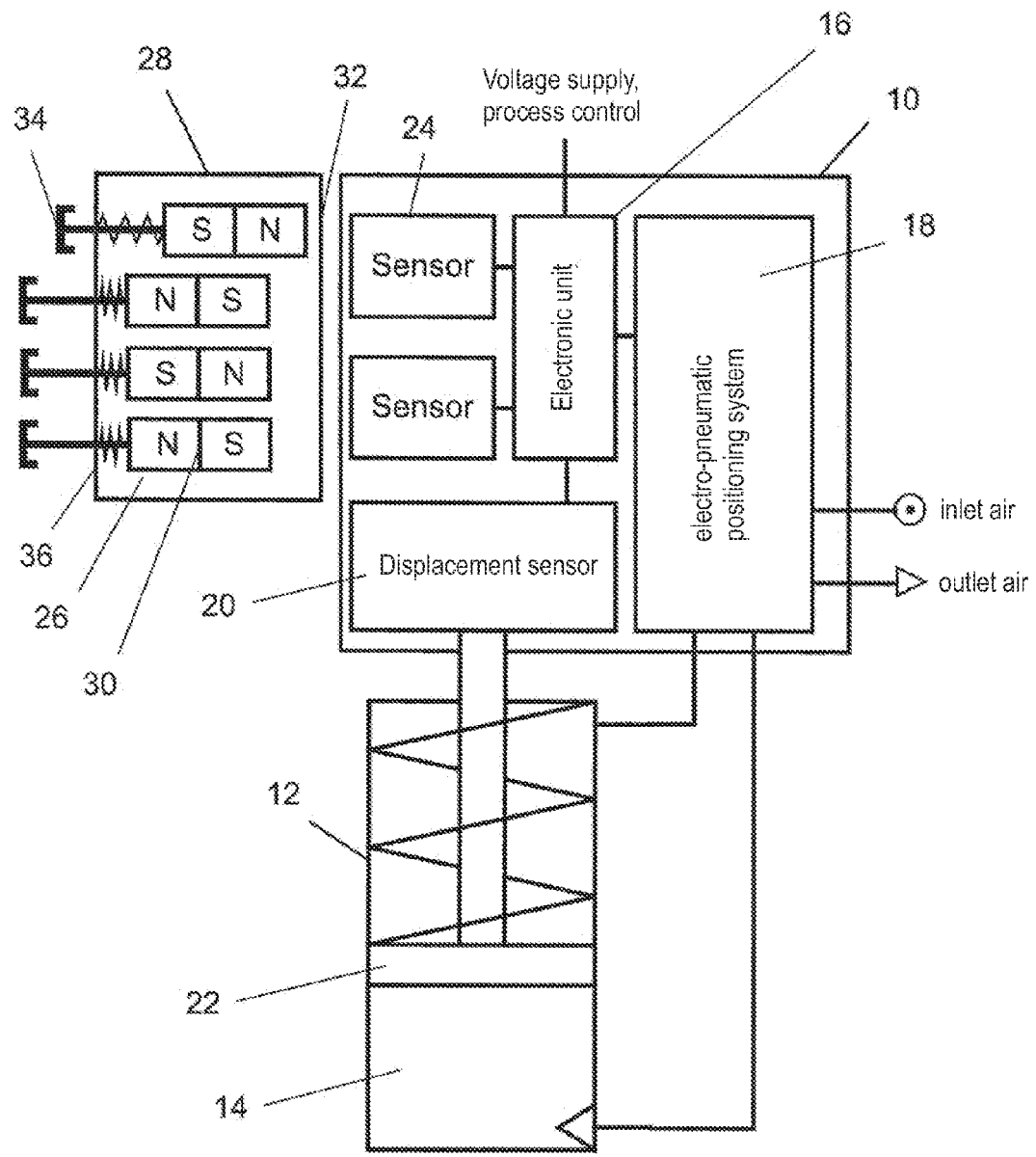
FIG. 1 shows a schematic illustration of a valve control system according to a first embodiment of the invention.

FIG. 1 shows by way of example a valve control device 10 for controlling a pneumatic drive 12 having a pneumatic cylinder 14 for a process valve. Typical components of a valve control device 10 of this type are a central electronic unit 16, an electro-pneumatic positioning system 18 and a displacement sensor 20 for determining the position of a piston 22 movable in the pneumatic cylinder 14.

The invention is however not limited to this type of valve control devices, but also encompasses any types of valve control devices requiring operating actions on certain occasions.

The valve control device 10 further comprises a magnetic field sensor arrangement 24 including one or more sensors which are adapted to detect a change of the field strength and/or of the field direction of a magnetic field present in proximity, and to output appropriate signals. Suitable sensors for this purpose are Hall sensors, for example.

The magnetic field sensor arrangement 24 is protected from external (mechanical) influences by a magnetically non-shielding housing, in particular a plastic housing. The other components of the valve control device 10 are also accommodated in the housing. The housing does not significantly impair the sensitivity of the magnetic field sensor arrangement 24.

The magnetic field sensor arrangement 24 of the valve control device 10 is adapted to a magnet arrangement 26 of a hand-held actuating apparatus 28 which together with the valve control device 10 forms a valve control system. The magnet arrangement 26 is received in a magnetically non-shielding housing of the hand-held actuating apparatus 28, in particular a plastic housing, and includes a plurality of strong magnets 30. In the example embodiment illustrated, the magnets 30 are permanent magnets.

The magnets 30 of the magnet arrangement 26 are accommodated in a particular manner in the hand-held actuating apparatus 28. The magnets 30 are adapted to be linearly shifted between two defined positions. In a first position, the distance of the respective magnet 30 from a rear housing side 32 is greater than in a second position. For the sake of simplicity, the first position is hereinafter referred to as "passive" position and the second position as "active" position.

For a manual shifting of the magnets 30, a button 34 is provided for each magnet 30 on a front housing side 36 opposite the rear housing side 32. The associated magnet 30 is shifted from the passive position to the active position by pressing the button 34.

The required mechanical coupling of the magnet 30 to the button 34 can be supplemented with a pretensioning and locking mechanism in view of a comfortable operation. These mechanisms ensure that by a single pressing of the button 34, the magnet 30 is shifted contrary to a pretensioning force, provided by a tension spring, e.g., in a shifting direction to the active position and is locked there. By pressing the button 34 again, the magnet 30 is released and automatically shifted back to the passive position by the pretensioning force.

As already mentioned, the magnetic field sensor arrangement 24 with the sensors and the magnet arrangement 26 with the magnets 30 are adapted to each other. This particularly applies to the sensor sensitivity and the magnetic field strength of the magnet 30 in the active position and to the geometric arrangement of the magnets 30 (polarity) and of the sensors. The influence of noise fields is thus nearly excluded.

The functioning of the valve control system is explained below with reference to the example of the valve control system shown in FIG. 1. Operating actions can be triggered in the valve control device 10 by means of the hand-held actuating apparatus 28. To this end, the hand-held actuating apparatus 28 is brought with the rear housing side 32 close to the magnetic field sensor arrangement 24. A special holder may be provided for the hand-held actuating apparatus 28, to stably hold the latter at a defined distance and in a defined arrangement relative to the magnetic field sensor arrangement 24.

The sensors of the magnetic field sensor arrangement 24 can detect the presence of the magnetic fields (field strength and field direction) generated by the magnets 30 of the magnet arrangement 26, at least when the magnets 30 are in the active position. The magnetic field sensor arrangement 24 is in particular configured such as to be adapted to detect the presence of the magnetic field of the magnets 30 individually, preferably also the field strength (quantitatively) and/or the direction thereof.

When a magnet 30 is shifted to the active or to the passive position by depressing the button without movement of the hand-held actuating apparatus 28 relative to the sensors of the magnetic field sensor arrangement 24, the magnetic field detectable by the magnetic field sensor arrangement 24 changes significantly, and the magnetic field sensor arrangement 24 generates a signal which is characteristic of this magnet 30 and of the direction of movement. This also applies if several buttons 34 are intentionally pressed simultaneously, i.e. if several magnets 30 are simultaneously shifted to the active or passive position.

In this way, it is possible to generate in a contactless manner different signals in the valve control device 10 using the hand-held actuating apparatus 28, the signals being associated with different commands defined in the electronic unit 16 (coding). The commands represent triggers of corresponding operating actions in the valve control device 10.

Figure 2:
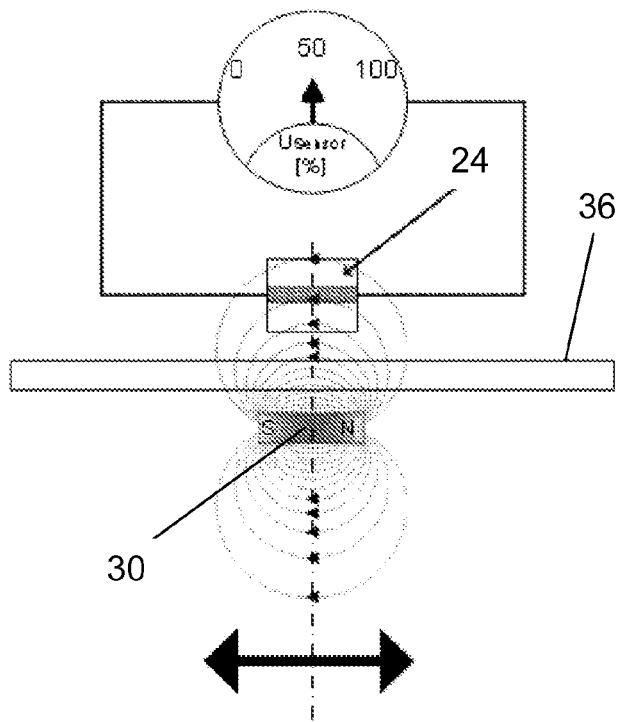
FIG. 2 shows a schematic diagram of a magnet arrangement and of a magnetic field sensor arrangement in a first position.
Figure 3:
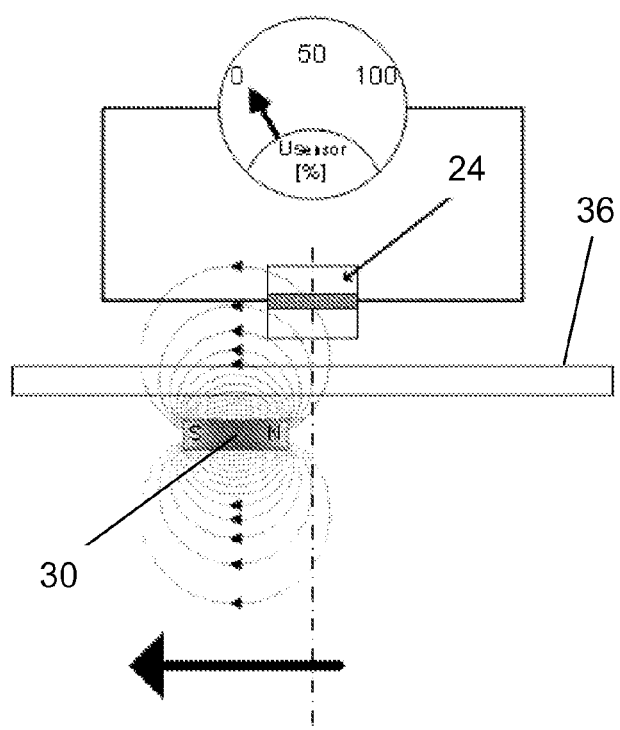
FIG. 3 shows the magnet arrangement and the magnetic field sensor arrangement of FIG. 2 in a second position.
Figure 4:
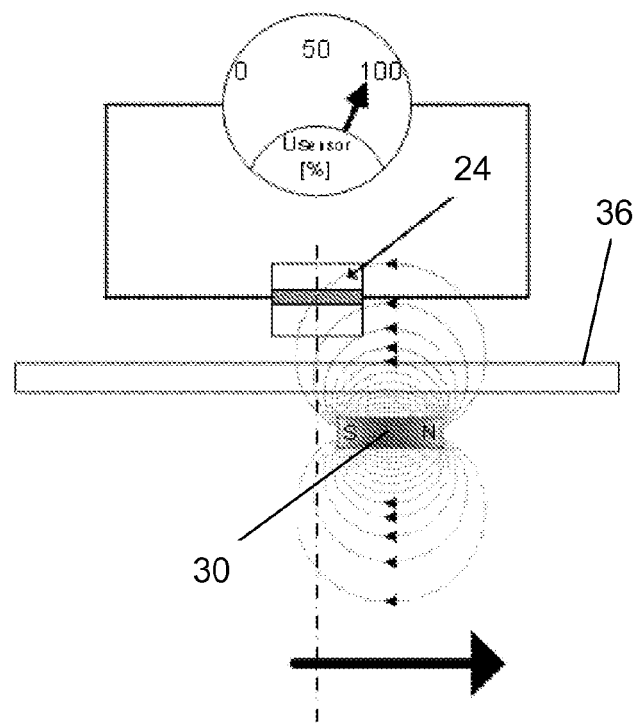
FIG. 4 shows the magnet arrangement and the magnetic field sensor arrangement of FIG. 2 in a third position.

FIGS. 2 to 4 show, in a simplified embodiment, the interaction between the magnet arrangement 26 (here with only one magnet 30) of the hand-held actuating apparatus 28 and the magnetic field sensor arrangement 24 (here with only one Hall sensor) of the valve control device 10.

In FIG. 2, the magnet 30, the magnetic field of which is not significantly influenced by the front housing side 36, takes a central, neutral position relative to the Hall sensor of the magnetic field sensor arrangement 24. The center line of the magnet 30 intersects the center line of the Hall sensor. The effect of the field lines on the Hall sensor is neutralized by the symmetry. The output voltage of the Hall sensor is thus substantially the same as the output voltage without the presence of a magnetic field.

In FIG. 3, the magnet 30 is deflected to the left. The center line of the magnet 30 does not intersect the center line of the Hall sensor anymore, there is no longer a symmetry. The field lines pass through the Hall sensor "from the front to the back". The output voltage of the Hall sensor corresponds to the presence of a magnetic field whose north pole faces the Hall sensor.

In FIG. 4, the magnet 30 is deflected to the right. The center line of the magnet 30 does no longer intersect the center line of the Hall sensor, either, there is no symmetry. The field lines pass through the Hall sensor "from the back to the front". The output voltage of the Hall sensor corresponds to the presence of a magnetic field whose south pole faces the Hall sensor.

The different output voltages of the Hall sensor or the specific sequences of the voltages are detected and interpreted by the electronic unit 16 of the valve control device 10 as unambiguous commands.

Figure 5:
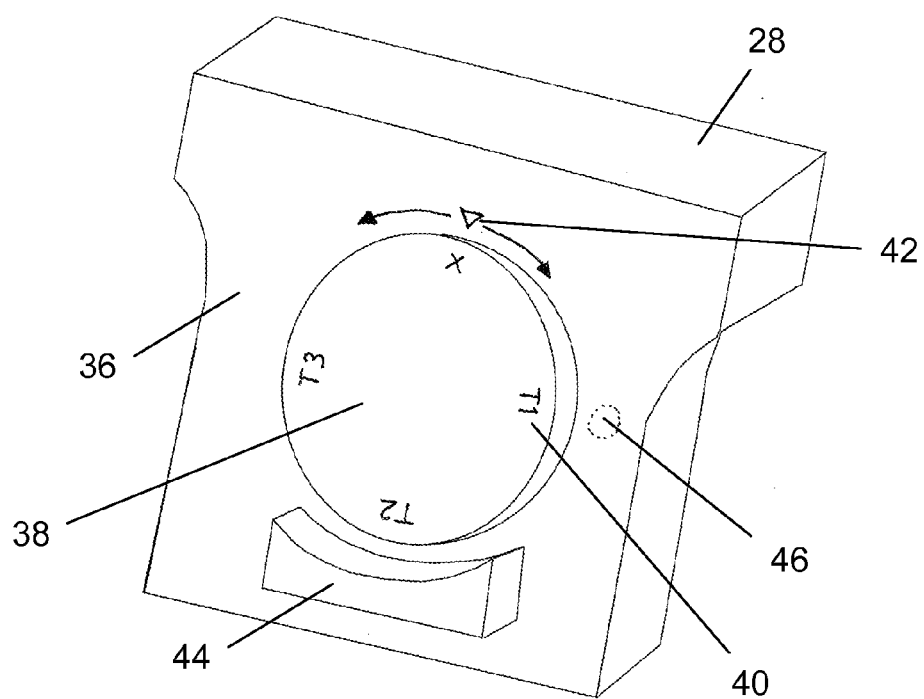
FIG. 5 shows a hand-held actuating apparatus of the valve control device according to a second embodiment.

FIG. 5 shows a particular embodiment of the hand-held actuating apparatus 28 in the form of a rotary encoder. The hand-held actuating apparatus 28 includes a rotary wheel 38 which is accessible on the front housing side 36 and can be rotated relative to the housing. Several magnets 30 are arranged spaced apart from each other in the peripheral direction. Markings 40 are placed at the corresponding positions of the rotary wheel 38. The main direction of magnetization is respectively oriented parallel to the axis of rotation of the rotary wheel 38.

The magnets 30 may differ in their orientation, i.e. the rear housing side 32 may face a north pole or a south pole. Furthermore, the length of the magnets 30 and/or the axial length thereof may be different. In this way, it is possible to represent a multitude of characteristic magnetic fields.

By rotating the rotary wheel 38, the magnetic field of each magnet 30 can be brought to a predetermined input spot 42. The input spot 42 is brought in a position opposite a magnetic field sensor, in particular a Hall sensor, of the magnetic field sensor arrangement 24 of the valve control device 10 to input a command. The sensor detects the different magnetic fields of the magnets 30, so that by an appropriate rotation of the rotary wheel 38, commands can be transmitted to the valve control device 10.

A magnetic locking mechanism for the rotary wheel 38 is formed by an iron piece 46 or the like, which is firmly mounted in the hand-held actuating apparatus 28 in proximity to the rotary wheel 38. Due to the attractive force of that magnet 30 that has the smallest distance from the iron piece 46, the rotary wheel 38 takes automatically a respective stable locking position.

An input button 44 having a further magnet 30 may in addition be provided, which with respect to its position is adapted to a further magnetic field sensor of the magnetic field sensor arrangement 24. By pressing the input button 44, the magnet 30 thereof is brought closer to the sensor, which is detected by the sensor and interpreted as an input confirmation. The input button 44 may be equipped with a pretensioning mechanism which automatically moves the input button 44 back to its initial position.

Many further configurations of the magnetic field sensor arrangement 24 are possible, in which the magnetic fields of the magnets 30 are individually variable by the actuating means without movement of the hand-held actuating apparatus 28 relative to the magnetic field sensor arrangement 24, to thus transmit commands to the valve control device 10.

A detection (decoding) of specific movements of the overall hand-held actuating apparatus 28 may optionally be provided in proximity to the magnetic field sensor arrangement 24. These movements may differ in the number and arrangement of the magnets 30 which are respectively in the active position.

Generally, the number of distinguishable signals or commands varies with the number of the magnets 30 and the sensors that are present and the arrangement thereof. The number of distinguishable signals or commands may be further increased by the use of magnets 30 having different strengths, and by the provision of intermediate positions between the active and the passive position.

Instead of permanent magnets it also possible to provide one or more solenoids. A control of the solenoids by means of which the current supply and/or the direction of the current flow (and thus the polarity of the solenoid or solenoids) can be changed increases the number of possible command codes. By a suitable temporal variation of the control, it is also possible to transmit larger data volumes into the valve control device 10 in a wireless and contactless manner.

For a further improvement of the operating convenience or within the context of a configuration as a positioner, the hand-held actuating apparatus 28 may also include a display on which relevant information for operation and/or on the current status of the valve control device 10 is displayed for the user.

The invention claimed is:

1. A valve control system comprising a valve control device, and a hand-held actuating apparatus for triggering operating actions within the valve control device, the hand-held actuating apparatus including a magnet arrangement, and the valve control device including a magnetic field sensor arrangement adapted to the magnet arrangement of the hand-held actuating apparatus, wherein the magnet arrangement includes two or more magnets and an actuating means, the magnetic fields of the magnets being individually variable by the actuating means without movement of the hand-held actuating apparatus relative to the magnetic field sensor arrangement, wherein the actuating means includes buttons, each magnet being coupled to a button such that a depression of the button causes the magnet to be shifted.

2. The valve control system according to claim 1, wherein the magnets are adapted to be individually shifted from a first position to a second position.

3. The valve control system according to claim 2, wherein in the first position, the distance of the magnets from a housing side of the hand-held actuating apparatus is greater than in the second position.

4. The valve control system according to claim 1, further including a pretensioning mechanism which pretensions the button contrary to a shifting direction.

5. The valve control system according to claim 2, further including a locking mechanism which causes the button to lock when the magnet reaches the second position.

6. The valve control system according to claim 1, further including a holder in which the hand-held actuating apparatus can be stably held at a defined distance and in a defined arrangement relative to the magnetic field sensor arrangement.

7. The valve control system according to claim 1, wherein the magnetic field sensor arrangement is designed such that it can detect the presence of the magnetic fields of the magnets individually.

8. The valve control system according to claim 7, wherein the magnetic field sensor arrangement is designed such that it can also detect one of the quantitative field strength and the direction of the magnetic fields.

9. The valve control system according to claim 1, wherein the hand-held actuating apparatus includes a display on which one of the following is displayed: information for operation of the valve control device, information on the current status of the valve control device.

10. The valve control system according to claim 4, further including a locking mechanism which causes the button to lock when the magnet reaches the second position.

* * * * *